(12) United States Patent
Wang

(10) Patent No.: US 11,615,049 B2
(45) Date of Patent: Mar. 28, 2023

(54) PROGRAMMABLE SERIAL INPUT-OUTPUT CONTROLLER, OPERATION SYSTEM AND METHOD

(71) Applicant: Nuvoton Technology Corporation, Hsinchu Science Park (TW)

(72) Inventor: Cheng-Chih Wang, Jhubei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/563,735

(22) Filed: Dec. 28, 2021

(65) Prior Publication Data

US 2022/0206988 A1 Jun. 30, 2022

(30) Foreign Application Priority Data

Dec. 30, 2020 (TW) .................................. 109146775

(51) Int. Cl.
*G06F 13/42* (2006.01)

(52) U.S. Cl.
CPC .............................. *G06F 13/4291* (2013.01)

(58) Field of Classification Search
CPC .... G06F 13/4282; G06F 13/4291; G06F 9/30; G06F 9/46; G05B 19/05
See application file for complete search history.

(56) References Cited

U.S. PATENT DOCUMENTS

| 5,495,407 | A | * | 2/1996 | Sobue | G05B 19/05 |
| | | | | | 318/811 |
| 6,594,529 | B1 | * | 7/2003 | Boggs | G05B 19/0423 |
| | | | | | 700/12 |
| 2011/0102053 | A1 | * | 5/2011 | Wang | G06F 13/4068 |
| | | | | | 327/365 |
| 2011/0208885 | A1 | * | 8/2011 | Kwek | G06F 13/4072 |
| | | | | | 713/600 |
| 2019/0050019 | A1 | * | 2/2019 | Sheafor | G06F 1/12 |

FOREIGN PATENT DOCUMENTS

| CN | 101079017 A | 11/2007 |
| CN | 101819559 A | 9/2010 |
| CN | 103793340 A | 5/2014 |
| EP | 1860815 A1 * | 11/2007 ......... G06F 13/4291 |
| TW | 321309 | 11/1997 |
| TW | 200827958 A | 7/2008 |
| WO | WO00/55697 A1 | 9/2000 |

* cited by examiner

*Primary Examiner* — Phong H Dang
(74) *Attorney, Agent, or Firm* — Muncy, Geissler, Olds & Lowe, P.C.

(57) ABSTRACT

A programmable serial input-output controller is provided. A timer circuit performs a timing operation. An input pin is configured to receive an input signal from an external circuit. An output pin is configured to provide an output signal to the external circuit. In an output mode, the sequence controller provides an initial level to the output pin and controls the timer circuit to perform the timing operation. In response to a duration of the timer circuit performing the timing operation reaching first transmission time, the sequence controller inverts the level of the output pin and controls the timer circuit to re-perform the timing operation. In response to the duration of the timer circuit re-performing the timing operation reaching second transmission time, the sequence controller inverts the level of the output pin.

20 Claims, 7 Drawing Sheets

PROGRAMMABLE SERIAL INPUT-OUTPUT CONTROLLER, OPERATION SYSTEM AND METHOD

CROSS REFERENCE TO RELATED APPLICATIONS

This Application claims priority of Taiwan Patent Application No. 109146775, filed on Dec. 30, 2020, the entirety of which is incorporated by reference herein.

BACKGROUND OF THE INVENTION

Field of the Invention

The invention relates to a controller, and more particularly to a controller which is capable of programming serial input data.

Description of the Related Art

Serial transmission and parallel transmission are common transmission methods. Due to the high stability of the serial transmission method and the diversification of interface protocols of the serial transmission method, the serial transmission method is more commonly used. In order to receive serial data, the chip usually has a corresponding receiver. Universal serial bus (USB) receivers and inter-integrated circuit (I2C) bus receivers are common receivers.

However, each receiver only receives corresponding serial data. For example, USB receivers only receive serial data which matches the USB interface protocol. A USB receiver cannot receive serial data matching the I2C interface protocol. Similarly, I2C receivers only receive serial data which matches the I2C interface protocol. An I2C receiver cannot receive serial data matching the USB interface protocol.

BRIEF SUMMARY OF THE INVENTION

In accordance with an embodiment of the disclosure, a programmable serial input-output controller is coupled between an external circuit and a microcontroller and comprises a timer circuit, a pin controller, and a sequence controller. The timer circuit is configured to perform a timing operation. The pin controller is coupled to the external circuit and comprises an input pin and an output pin. The input pin is configured to receive an input signal from the external circuit. The output pin is configured to provide an output signal to the external circuit. The sequence controller is coupled between the pin controller and the microcontroller and operates in an output mode or an input mode. In the output mode, the sequence controller provides an initial level to the output pin and controls the timer circuit to perform the timing operation. In response to the duration of the timer circuit performing the timing operation reaching first transmission time, the sequence controller inverts the level of the output pin and controls the timer circuit to re-perform the timing operation. In response to the duration of the timer circuit re-performing the timing operation reaching second transmission, the sequence controller inverts the level of the output pin. In the input mode, the sequence controller decodes the input signal to generate a decoded result and send the decoded result to the microcontroller.

In accordance with another embodiment of the disclosure, an operation system comprises an external circuit, a microcontroller, and a programmable serial input-output controller. The external circuit has a transmission terminal and a receiving terminal. The transmission terminal is configured to provide an input signal. The receiving terminal is configured to receive an output signal. The microcontroller executes an output procedure or an input procedure. The programmable serial input-output controller comprises a timer circuit, a pin controller, and a sequence controller. The timer circuit is configured to perform a timing operation. The pin controller is coupled to the external circuit and comprises an input pin and an output pin. The input pin is configured to receive the input signal. The output pin is configured to output the output signal. The sequence controller is coupled between the pin controller and the microcontroller. In response to the microcontroller executing the output procedure, the sequence controller provides an initial level to the output pin and controls the timer circuit to perform the timing operation. In response to the duration of the timer circuit performing the timing operation reaching first transmission time, the sequence controller inverts the level of the output pin and controls the timer circuit to re-perform the timing operation. In response to the duration of the timer circuit re-performing the timing operation reaching second transmission time, the sequence controller inverts the level of the output pin. In response to the microcontroller executing the input procedure, the sequence controller decodes the input signal to generate a decoded result and send it to the microcontroller.

In accordance with a further embodiment of the disclosure, an operation method for programming serial input data and serial output data is provided. An exemplary embodiment of an operation method is described in the following paragraph. The level of an output pin is set to an initial level. A timing operation is performed. A determination is made as to whether the duration of the timing operation reaches first transmission time. In response to the duration of the timing operation reaching the first transmission time, inverting the level of the output pin and re-performing the timing operation. A determination is made as to whether the duration of the timing operation reaches second transmission time after re-performing the timing operation. In response to the duration of the timing operation reaching the second transmission time, inverting the level of the output pin. The level of the output pin constitutes the serial output data.

Operation methods for programming serial input data and serial output data may be practiced by the operation system which have hardware or firmware capable of performing particular functions and may take the form of program code embodied in a tangible media. When the program code is loaded into and executed by an electronic device, a processor, a computer or a machine, the electronic device, the processor, the computer or the machine becomes an operation system for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
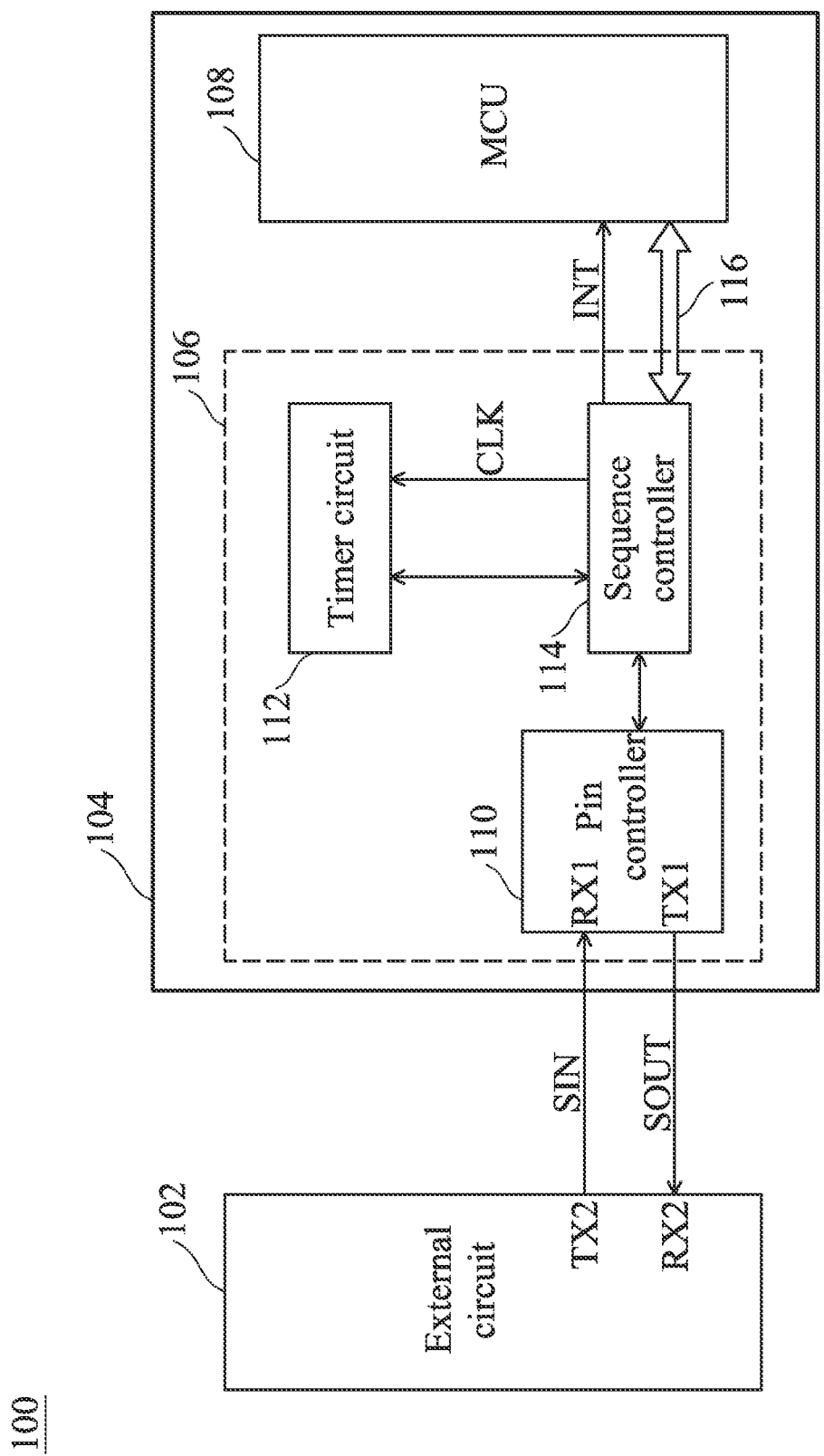
FIG. 1 is a schematic diagram of an exemplary embodiment of an operation system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system according to various aspects of the present disclosure. As shown in FIG. 1, the operation system 100 comprises an external circuit 102 and a processing circuit 104. The external circuit 102 comprises an input pin RX2 and an output pin TX2. The output pin TX2 is configured to provide an input signal SIN. The input pin RX2 is configured to receive an output signal SOUT. In one embodiment, the input signal SIN and the output signal SOUT are serial signals. For example, the input signal SIN and the output signal SOUT may match an inter-integrated circuit (I2C) interface protocol or a universal serial bus (USB) interface protocol. Additionally, the structure of external circuit 102 is not limited in the present disclosure. The external circuit 102 may comprise at least one microprocessor, at least one microcontroller, and at least one memory.

The processing circuit 104 provides the output signal SOUT to the external circuit 102. In this embodiment, the processing circuit 104 is capable of providing different output signals matching different protocols to adapt to different external circuits. In one embodiment, the processing circuit 104 may use different time set values to control the level of the output signal SOUT so that the output signal SOUT matches different interface protocol. Since the time set values do not occupy too much memory space, so it can increase the usable space of the memory in the processing circuit 104.

In other embodiment, the processing circuit 104 receives and processes the input signal SIN. In this case, the processing circuit 104 analyzes the input signal SIN to generate an analysis result and operates according to the analysis result. Since the processing circuit 104 stores the analysis result but the input signal SIN, the usable space of the memory in the processing circuit 104 can be increased.

In this embodiment, the processing circuit 104 comprises a programmable serial input-output controller 106 and a microcontroller (MCU) 108. The MCU 108 executes an output procedure or an input procedure. When the MCU 108 executes an output procedure, the MCU 108 provides at least one time set value to the programmable serial input-output controller 106 and directs the programmable serial input-output controller 106 to enter an output mode. In the output mode, the programmable serial input-output controller 106 adjusts the level of the output signal SOUT according to the time set value provided by the MCU 108. At this time, the output signal SOUT is provided as serial output data.

In other embodiments, when the MCU 108 executes an input procedure, the MCU 108 directs the programmable serial input-output controller 106 to enter an input mode. In the input mode, the programmable serial input-output controller 106 receives and processes the input signal SIN to generate a processed result and provides the processed result to the MCU 108. The MCU 108 operates according to the processed result. In this case, the input signal SIN is serial input data and matches a specific interface protocol, such as I2C or USB. No matter the input signal SIN matches which interface protocol, the programmable serial input-output controller 106 can obtain that the input signal SIN matches which interface protocol according to the level of the input signal SIN.

In this embodiment, the programmable serial input-output controller 106 comprises a pin controller 110, a timer circuit 112, and a sequence controller 114. The pin controller 110 is coupled to the external circuit 102 and comprises an input pin RX1 and an output pin TX1. The input pin RX1 is configured to receive the input signal SIN. The output pin TX1 is configured to provide the output signal SOUT.

The timer circuit 112 is configured to perform a timing operation. The structure of timer circuit 112 is not limited in the present disclosure. In one embodiment, the timer circuit 112 comprises one timer or more timers. In another embodiment, the timer circuit 112 stores the time set value provided by the MCU 108. In such cases, the timer circuit 112 may directly receive the time set value provided by the MCU 108 or indirectly receive the time set value via the sequence controller 114 from the MCU 108.

The sequence controller 114 is coupled between the pin controller 110 and the MCU 108. When the MCU 108 executes an output procedure, the sequence controller 114 enters an output mode. In the output mode, the sequence controller 114 provides an initial level (e.g., a high level) to the output pin TX1 and controls the timer circuit 112 to start performing the timing operation. When an overflow or an underflow occurs in the timer circuit 112, it means that the duration of the timing operation performed by the timer circuit 112 has reached first transmission time (e.g., 1 second). Therefore, the sequence controller 114 inverts (or reverses) the level of the output pin TX1 (e.g., from the initial level to a first level), and directs the timer circuit 112 to re-perform the timing operation. When the overflow or the underflow occurs in the timer circuit 112 again, it means that the duration of the timing operation performed by the timer circuit 112 has reached second transmission time (e.g., 2 seconds). Therefore, the sequence controller 114 inverts the level of the output pin TX1 (e.g., from the first level to a second level), and directs the timer circuit 112 to re-perform the timing operation.

In one embodiment, the initial level is opposite to the first level. For example, when the initial level is a high level, the first level may be a low level. When the initial level is a low level, the first level may be a high level. In this case, the second level is the same as the initial level. In another embodiment, after inverting the level of the output pin TX1, the sequence controller 114 resets the timer circuit 112 and then triggers the timer circuit 112 so that the timer circuit 112 re-perform the timing operation. In some embodiments, the timer circuit 112 performs the timing operation according to a clock signal CLK. In such cases, the clock signal CLK is provided by the sequence controller 114, but the disclosure is not limited thereto. In other embodiments, the clock signal CLK is provided by the MCU 108.

The present disclosure does not limit how the first transmission time and the second transmission time are set. In one embodiment, the first transmission time and the second transmission time are set by the MCU 108. In this case, the first transmission time and the second transmission time associate with the time set values provided by the MCU 108. The first transmission time may be the same as or different from the second transmission time. In other embodiments, the MCU 108 writes more time set values into the timer circuit 112 to set transmission time. In this case, the number of times that the timer circuit 112 performs the timing operation is the same as the number of time set values. In one embodiment, the timer circuit 112 reads the time set values in order to set the transmission time and performs the timing operation according to each transmission time. In some embodiments, the time set values are stored in the sequence controller 114. In such case, the sequence controller 114 triggers the timer circuit 112 according to each time set value so that the timer circuit 112 performs the timing operation many times. The number of times that the sequence controller 114 triggers the timer circuit 112 is the same as the number of time set values. In other embodiments, the timer circuit 112 may comprise a plurality of timers. Each timer performs a timing operation according to the corresponding time set value. In such cases, the duration in which one timer circuit performs the timing operation may be the same as or different from the duration in which another timer circuit performs the timing operation. In some embodiments, the sequence controller 114 may repeatedly read many time set values to repeatedly send the same output signal SOUT to the external circuit 102.

In other embodiments, the sequence controller 114 communicates with MCU 108 via a bus 116. For example, the sequence controller 114 receives the time set values from the MCU 108 via the bus 116 or provides the processed result to the MUC 108 via the bus 116. In some embodiments, the sequence controller 114 further provides an interrupt signal INT to the MCU 108. In this case, the MCU 108 obtains that the sequence controller 114 has provided the output signal SOUT to the external circuit 102 according to the interrupt signal INT or obtains that the input signal SIN provided by the external circuit 102 has been received by the sequence controller 114 according to the interrupt signal INT.

When the MCU 108 executes an input procedure, the sequence controller 114 enters an input mode. In the input mode, the sequence controller 114 records the initial level of the input pin RX1 and determines whether the level of the input pin RX1 has been changed. When the level of the input pin RX1 has been changed, the sequence controller 114 directs the timer circuit 112 to start the timing operation. The timer circuit 112 performs the timing operation, and simultaneously, the sequence controller 114 determines whether the level of the input pin RX1 has been re-changed. When the level of the input pin RX1 has been re-changed, the sequence controller 114 directs the timer circuit 112 to stop performing the timing operation. At this time, the sequence controller 114 determines the duration in which the timer circuit 112 performs the timing operation to generate and record a first execution value. The sequence controller 114 directs the timer circuit 112 to re-perform the timing operation. The timer circuit 112 re-performs the timing operation, and simultaneously, the sequence controller 114 determines whether the level of the input pin RX1 has been re-changed.

When the level of the input pin RX1 has been re-changed, the sequence controller 114 directs the timer circuit 112 to stop performing the timing operation. At this time, the sequence controller 114 detects the duration in which the timer circuit 112 re-performs the timing operation to generate and record a second execution value. Then, the sequence controller 114 directs the timer circuit 112 to re-perform the timing operation. The timer circuit 112 re-performs the timing operation, and simultaneously, the sequence controller 114 determines whether the level of the input pin RX has been re-changed.

However, when the level of the input pier RX1 is maintained, and the duration for which the level of the input pin RX1 has been maintained reaches predetermined time, the sequence controller 114 sends the interrupt signal INT. After receiving the interrupt signal INT, the MCU 108 returns the original wave of the input signal SIN (i.e., serial input data) according the initial level of the input pin RX1 detecting by the sequence controller 114 and each execution value recorded by the sequence controller 114. The MCU 108 executes a corresponding operation, such as an access operation, according to the returned result.

In other embodiments, in the input mode, the sequence controller 114 records the initial level of the input pin RX1 and determines whether the level of the input pin RX1 has been changed. When the level of the input pin RX1 has been changed, the sequence controller 114 controls the timer circuit 112 to perform a timing operation. When the duration in which the timer circuit 112 performs the timing operation reaches sampling time, the sequence controller 114 detects and records the level of the input pin RX1 to generate a first sampling value. Then, the sequence controller 114 directs the timer circuit 112 to re-perform the timing operation. In this case, when the duration in which the timer circuit 112 re-performs the timing operation reaches bit time, the sequence controller 114 detects and records the level of the input pin RX1 to generate a second sampling value.

In one embodiment, the sampling time and the bit time are stored in the timer circuit 112. In such case, the bit time is greater than the sampling time. The MCU 108 may previously store the sampling time and the bit time in the timer circuit 112 or in the sequence controller 114. In some embodiments, after the sequence controller 114 obtains the second sampling value, each time that the duration of the timing operation performed by the timer circuit 112 reaches the bit time, the sequence controller 114 detects and records the level of the input pin RX1 to generate a corresponding sampling value until the number of sampling values recorded in the sequence controller 114 reaches a predetermined value.

In this embodiment, the number of sampling values generated by the sequence controller 114 associates with the number of data bits of the input signal SIN. For example, if the designer previously determines that the input signal SIN is serial data with 8 bits provided by the external circuit 102 arranged with the processing circuit 104, the designer can store a predetermined value in the MCU 108 beforehand. The MCU 108 directs the sequence controller 114 to perform a sampling operation eight times according to the predetermined value to generate eight sampling values. After finishing the sampling operation, the sequence controller 114 may send an interrupt signal INT to notify the MCU 108. The MCU 108 returns the wave of the input signal SIN (i.e., the serial input data) according to the initial level of the input pin RX1 and the eight sampling values detected by the sequence controller 114. The MCU 108 executes a corresponding operation, such as an access operation, according to the returned result.

Figure 2:
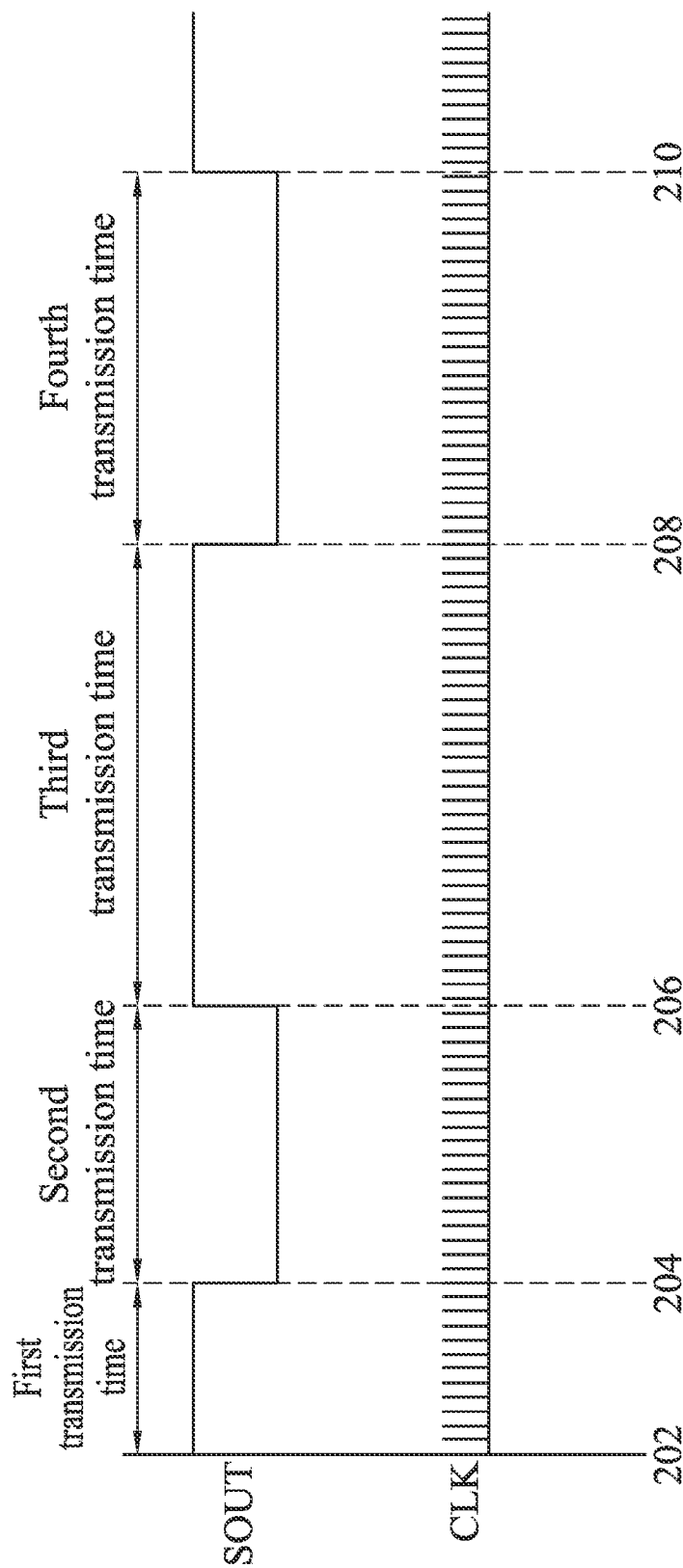
FIG. 2 is a control timing chart of an exemplary embodiment of a programmable serial input-output controller according to various aspects of the present disclosure.

FIG. 2 is a control timing chart of an exemplary embodiment of the output signal SOUT generated by the programmable serial input-output controller 106 according to various aspects of the present disclosure. When the MCU 108 executes an output procedure, the sequence controller 114 enters an output mode. In the output mode, the sequence controller 114 provides an initial level to the output pin TX1 at an initial time point 202. In this embodiment, the initial level of the output signal SOUT on the output pin TX1 is a high level. At this time, the sequence controller 114 resets and triggers the timer circuit 112 to perform a timing operation.

In one embodiment, the timer circuit 112 counts the number of pulses of the clock signal CLK. At time point 204, the number of pulses of the clock signal CLK counted by the timer circuit 112 is equal to a first predetermined value. Therefore, an overflow or an underflow occurs in the timer circuit 112. At this time, the duration of the timing operation performed by the timer circuit 112 reaches first transmission time so that the sequence controller 114 inverts the level of the output signal SOUT, such as from the initial level to a first level. In this embodiment, the first level is a low level. At this time, the sequence controller 114 resets the timer circuit 112 to remove the overflow or the underflow. The sequence controller 114 triggers the timer circuit 112 to direct the timer circuit 112 to re-perform the timing operation. In one embodiment, the timer circuit 112 re-counts the number of pulses of the clock signal CLK.

At time point 206, the number of pulses of the clock signal CLK counted by the timer circuit 112 is equal to a second predetermined value. This means that the duration of the timing operation performed by the timer circuit 112 reaches second transmission time (e.g., 2 seconds). Therefore, the sequence controller 114 inverts the level of the output signal SOUT, such as from the low level to a high level. At this time, the sequence controller 114 resets and then triggers the timer circuit 112 so that the timer circuit 112 re-counts the number of pulses of the clock signal CLK.

At time point 208, the number of pulses of the clock signal CLK is equal to a third predetermined value. This means that the duration of the timing operation performed by the timer circuit 112 reaches third transmission time. Therefore, the sequence controller 114 inverts the level of the output signal SOUT, such as from the high level to the low level. At this time, the sequence controller 114 resets and then triggers the timer circuit 112 so that the timer circuit 112 re-counts the number of pulses of the clock signal CLK.

At time point 210, the number of pulses of the clock signal CLK is equal to a fourth predetermined value. This means that the duration of the timing operation performed by the timer circuit 112 has reached fourth transmission time. Therefore, the sequence controller 114 inverts the level of the output signal SOUT, such as from the low level to the high level. At this time, the sequence controller 114 resets and then triggers the timer circuit 112 so that the timer circuit 112 re-counts the number of pulses of the clock signal CLK.

In one embodiment, the number of times that the timer circuit 112 performs the tuning operation is the same as the number of time set values provided by the MCU 108. Since the time set values do not occupy large space in the memory, no need to set up large-capacity memory in the programmable serial input-output controller 106. Therefore, the element cost is reduced.

Figure 3:
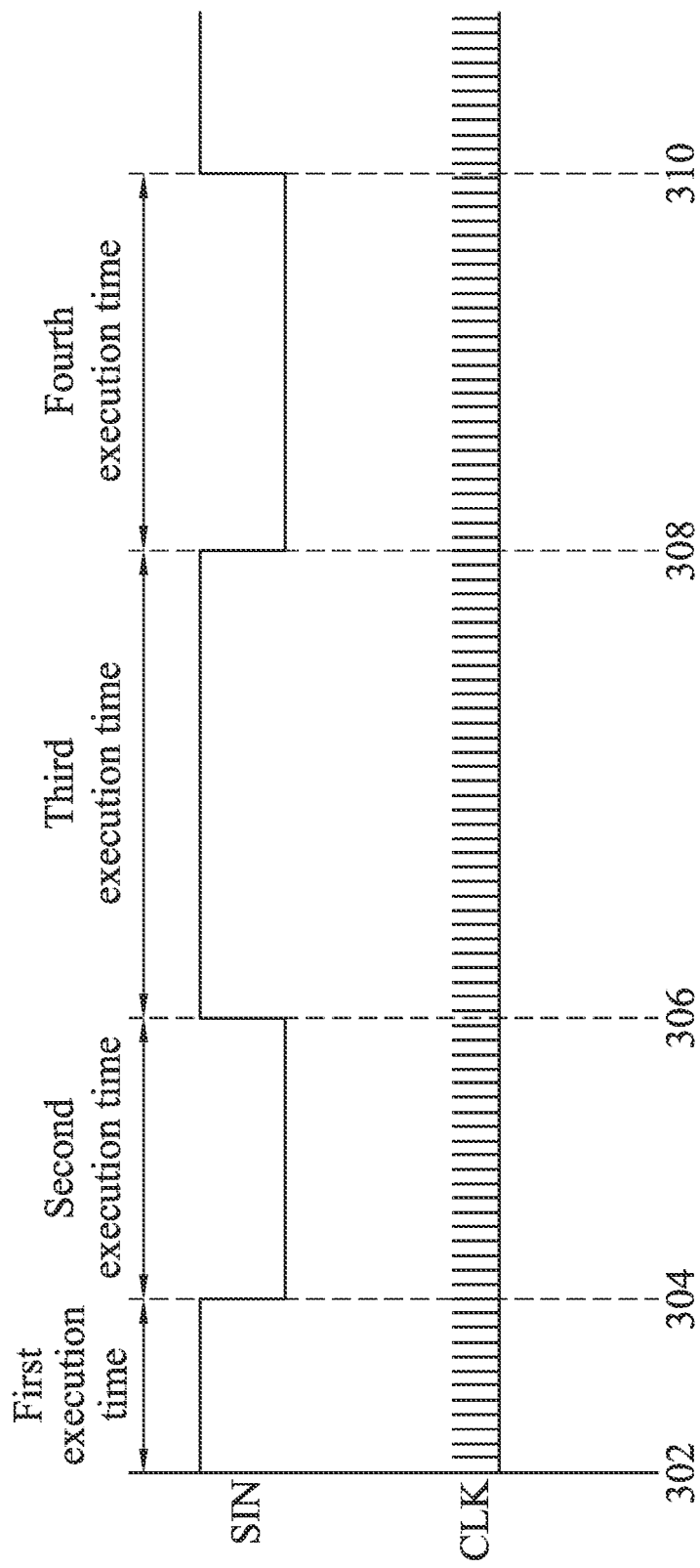
FIG. 3 is a control timing chart of another exemplary embodiment of the programmable serial input-output controller according to various aspects of the present disclosure.

FIG. 3 is a control timing chart of another exemplary embodiment of the input signal SIN received by the programmable serial input-output controller 106 according to various aspects of the present disclosure. When the MCU 108 executes an input procedure, the sequence controller 114 enters an input mode. In the input mode, the sequence controller 114 records an initial level of the input signal SIN received by the input pin RX1 at the initial time point 302. In this embodiment, the initial level of the input signal SIN is a high level. At this time the sequence controller 114 directs the timer circuit 112 to start performing the timing operation and determines whether the level of the input signal SIN has been changed.

In one embodiment, the timer circuit 112 counts the number of pulses of the clock signal CLK. The sequence controller 114 obtains the duration of the timing operation performed by the timer circuit 112 according to the number of pulses of the clock signal CLK counted by the timer circuit 112. For example, when the number of pulses of the clock signal CLK counted by the timer circuit 112 is large, it means that the duration of the timing operation performed by the timer circuit 112 is long.

At time point 304, the level of the input signal SIN has been changed, such as from the initial level to a first level (e.g., a low level). Therefore, the sequence controller 114 directs the timer circuit 112 to stop the timing operation. At this time, the sequence controller 114 records the duration (referred to as first execution time) of the timing operation performed by the timer circuit 112 between the time points 302 and 304. At this case, the timer circuit 112 starts counting the number of pulses of the clock signal CLK at time point 302. At time point 304, the timer circuit 112 stops counting the number of pulses of the clock signal CLK. Therefore, the sequence controller 114 can obtain the duration of the timing operation performed by the timer circuit 112 between the time points 302 and 304 according to the number of pulses of the clock signal CLK counted by the timer circuit 112.

In other embodiments, the sequence controller 114 resets the timer circuit 112 to reset the count value of the timer circuit 112 at time point 304. Then, the sequence controller 114 triggers the timer circuit 112 so that the timer circuit 112 re-performs the timing operation. The timer circuit 112 re-performs the timing operation, and simultaneously, the sequence controller 114 determines whether the level of the input signal SIN has been re-changed.

At time point 306, the level of the input signal SIN has been re-changed. Therefore, the sequence controller 114 directs the timer circuit 112 to stop performing the timing operation. In this embodiment, the level of the input signal SIN has been changed from the first level (e.g., a low level) to a second level (e.g., a high level). At this time, the sequence controller 114 records the duration (referred to as second execution time) of the timing operation performed by the timer circuit 112 between the time points 304 and 306. Then, the sequence controller 114 resets and then triggers the timer circuit 112 so that the timer circuit 112 re-performs the timing operation. The sequence controller 114 determines whether the level of the input signal SIN has been re-changed.

At time point 308, the level of the input signal SIN has been re-changed. Therefore, the sequence controller 114 directs the timer circuit 112 to stop performing the timing operation. In this embodiment, the level of the input signal SIN has been changed from the second level (e.g., a high level) to the first level (e.g., a low level). The sequence controller 114 records the duration (referred to as third execution time) of the timing operation performed by the timer circuit 112 between the time points 306 and 308. Then, the sequence controller 114 resets and then triggers the timer circuit 112 at time point 308 so that the timer circuit 112 re-performs the timing operation. The sequence controller 114 determines whether the level of the input signal SIN has been re-changed.

At time point 310, the level of the input signal SIN has been re-changed. Therefore, the sequence controller 114 directs the timer circuit 112 to stop performing the timing operation. In this embodiment, the level of the input signal SIN has been changed from the first level (e.g., a low level) to the second level (e.g., a high level). At this time, the sequence controller 114 records the duration (referred to as fourth execution time) of the timing operation performed by the timer circuit 112 between the time points 308 and 310. Then, the sequence controller 114 resets and then triggers the timer circuit 112 so that the timer circuit 112 re-performs the timing operation. The timer circuit 112 performs the timing operation, and simultaneously, the sequence controller 114 determines whether the level of the input signal SIN has been re-changed.

In some embodiments, when the level of the input signal SIN has been maintained and the duration in which the level of the input signal SIN has been maintained reaches predetermined time, the sequence controller 114 sends an interrupt signal INT. After receiving the interrupt signal INT, the MCU 108 returns the wave of the input signal SIN (i.e., serial input data) according to the initial level of the input signal SIN and each execution time recorded by the sequence controller 114. The MCU 108 executes a corresponding operation, such as to access data, according to the returned result.

In this embodiment, the programmable serial input-output controller 106 stores the duration of the timing operation performed by the timer circuit 112. The programmable serial input-output controller 106 does not store the input signal SIN. Since the memory space occupied by the duration of the timing operation performed by the timer circuit 112 is less than the memory space occupied by the input signal SIN, the usable space of the memory in the programmable serial input-output controller 106 is increased. Additionally, since no high-capacity memory is disposed in the programmable serial input-output controller 106, the cost of the programmable serial input-output controller 106 is reduced.

Figure 4:
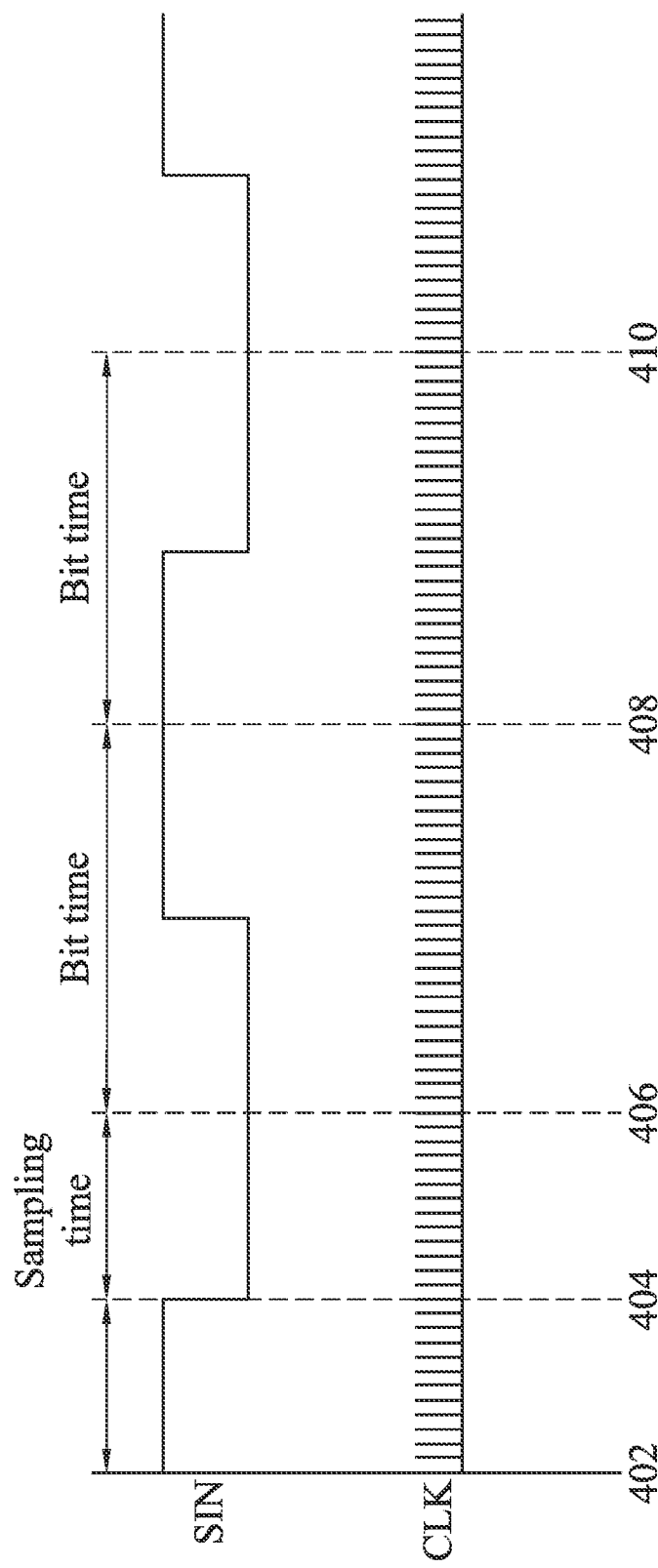
FIG. 4 is a control timing chart of another exemplary embodiment of the programmable serial input-output controller according to various aspects of the present disclosure.

FIG. 4 is a control timing chart of another exemplary embodiment of the input signal SIN received by the programmable serial input-output controller 106 according to various aspects of the present disclosure. When the MCU 108 executes an input procedure, the sequence controller 114 enters an input mode. In the input mode, the sequence controller 114 records an initial level of the input signal SIN at the initial time point 402. In this embodiment, the initial level of the input signal SIN is a high level. At this time, the sequence controller 114 controls the timer circuit 112 to start performing the timing operation and determines whether the level of the input signal SIN has been changed.

At time point 404, the level of the input signal SIN has been changed. Therefore, the sequence controller 114 directs the timer circuit 112 to perform the timing operation. In one embodiment, the sequence controller 114 first resets the timer circuit 112 and then triggers the timer circuit 112 so that the timer circuit 112 starts performing the timing operation. In some embodiments, the timer circuit 112 counts the number of pulses of the clock signal CLK. In such cases, the sequence controller 114 determines whether the duration of the timing operation performed by the timer circuit 112 reaches sampling time based on the number of pulses of the clock signal CLK counted by the timer circuit 112.

At time point 406, the duration of the timing operation performed by the timer circuit 112 reaches the sampling time. Therefore, the sequence controller 114 detects and records the level of the input signal SIN to generate a first sampling value. In this embodiment, since the level of the input signal SIN is a first level (e.g., a low level), the sequence controller 114 sets the first sampling value to a first value (e.g., 0). At this time, the sequence controller 114 directs the timer circuit 112 to re-perform the timing operation. In one embodiment, the sequence controller 114 re-resets the timer circuit 112 and then triggers the timer circuit 112 so that the timer circuit 112 starts the timing operation.

At time point 408, the duration of the timing operation performed by the timer circuit 112 reaches bit time. Therefore, the sequence controller 114 detects and records the level of the input signal SIN to generate a second sampling value. In this embodiment, since the level of the input signal SIN is at a second level (e.g., a high level), the sequence controller 114 sets the second sampling value to a second value (e.g., 1). At this time, the sequence controller 114 directs the timer circuit 112 to re-perform the timing operation. In one embodiment, the sequence controller 114 re-resets the timer circuit 112 and then triggers the timer circuit 112 so that the timer circuit 112 re-performs performing the timing operation.

At time point 410, the duration of the timing operation performed by the timer circuit 112 reaches bit time. Therefore, the sequence controller 114 detects and records the level of the input signal SIN to generate a third sampling value. In this embodiment, since the level of the input signal SIN is at the first level (e.g., a high level), the sequence controller 114 sets the third sampling value to the first value. At this time, the sequence controller 114 directs the timer circuit 112 to re-perform the timing operation. In one embodiment, the sequence controller 114 re-resets the timer circuit 112 and then triggers the timer circuit 112 so that the timer circuit 112 starts performing the timing operation.

In one embodiment, the sampling time and the bit time are stored in the timer circuit 112. In such cases, the bit time is greater than the sampling time. In this embodiment, after the sequence controller 114 obtains the first sampling value, each time that the duration of the timing operation performed by the timer circuit 112 reaches the bit time, the sequence controller 114 detects the level of the input pin RX1 to generate a corresponding sampling value.

In this embodiment, the number of sampling values generated by the sequence controller 114 relates the number of data bits of the input signal SIN. For example, if the designer previously determines that the input signal SIN is serial data with 8 bits provided by the external circuit 102 arranged with the processing circuit 104, the designer can store a set value in the MCU 108 beforehand. The MCU 108 directs the sequence controller 114 to perform a sampling operation eight times according to the set value to generate eight sampling values. After finishing the sampling operation, the sequence controller 114 may send an interrupt signal INT to notify the MCU 108. The MCU 108 returns the wave of the input signal SIN (i.e., the serial input data) according to the initial level of the input pin RX1 and the eight sampling values detected by the sequence controller 114. The MCU 108 executes a corresponding operation, such as an access operation, according to the returned result.

Figure 5:
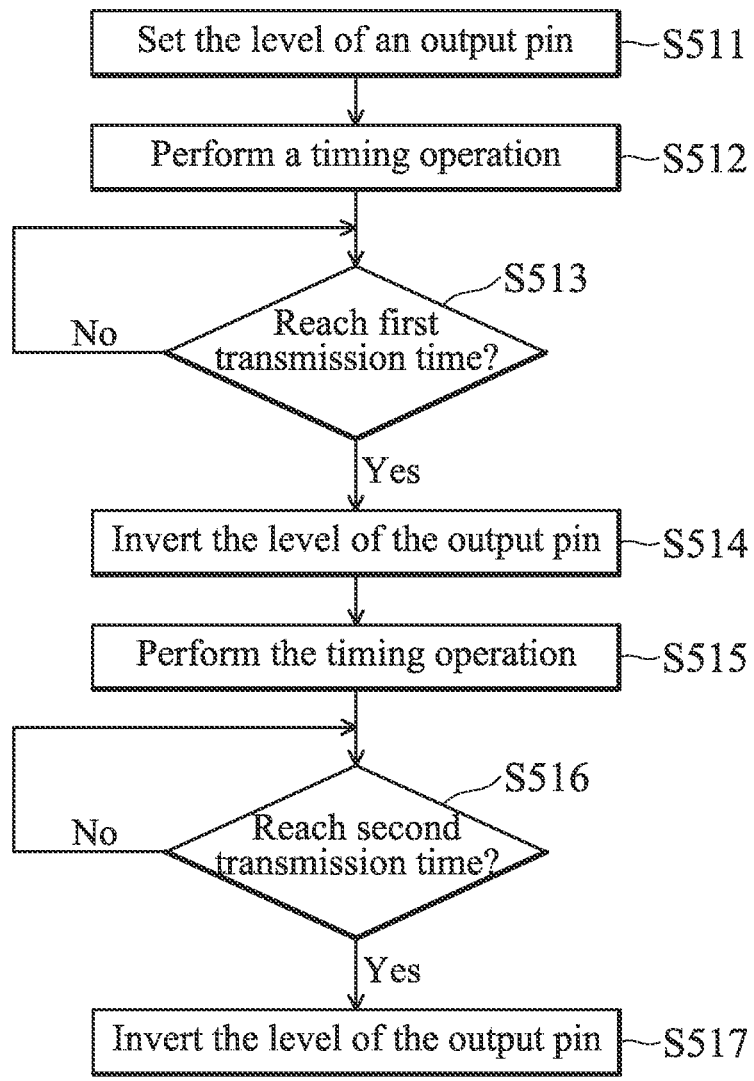
FIG. 5 is a flowchart schematic diagram of an exemplary embodiment of an operation method according to various aspects of the present disclosure.

FIG. 5 is a flowchart schematic diagram of an exemplary embodiment of an operation method according to various aspects of the present disclosure. The operation method of FIG. 5 is used to program serial output data and can be applied in the control circuit 104 shown in FIG. 1. First, the level of an output pin is set to an initial level (step S511). In one embodiment, the output pin is configured to provide the serial output data.

Then, a timing operation is performed (step S512). In one embodiment, step S512 is to trigger a counter so that the counter counts the number of pulses of a clock signal. In this case, before triggering the counter, step S512 is to reset the counter to initialize the count value of the counter.

Next, a determination is made as to whether the duration of the timing operation has reached first transmission time (step S513). When the duration of the timing operation has not reached the first transmission time, step S513 is performed. When the duration of the timing operation reaches the first transmission time, the level of the output pin is inverted (step S514). For example, in step S511, if the initial level of the output pin is a high level, step S514 is to set the level of the output pin to a low level. Similarly, in step S511, if the initial level of the output pin is a low level, step S514 is to set the level of the output pin to a high level. In this embodiment, the level of the output pin in step S514 is opposite to the level of the output pin in step S511.

Then, the timing operation is re-performed (step S515). Since the operation of step S515 is similar to the operation of step S512, the description of the operation of step S515 is omitted. Next, a determination is made as to whether the duration of the timing operation has reached second transmission time (step S516). When the duration of the timing operation has not reached the second transmission time, step S516 is performed to monitor the duration of the timing operation. When the duration of the timing operation reaches the second transmission time, the level of the output pin is inverted (step S517). For example, if the level of the output pin is a low level in step 514, step S517 is to set the level of the output pin to a high level. Similarly, if the initial level of the output pin is a low level in step S514, step S517 is to set the level of the output pin to a high level. In this embodiment, the level of the output pin in step S517 is opposite with the level of the output pin in step S514 and is the same as the level of the output pin in step S511. In some embodiments, the first transmission time may be the same as or different from the second transmission time.

In one embodiment, the level of the output pin is controlled to generate serial output data. Additionally, in FIG. 5, steps S514 and S517 invert the level of the output pin. In other embodiments, the level of the output pin is inverted in many times. The number of times that the level of the output pin is inverted is related to the logic value of the serial output data and the number of data bits of the serial output data.

Figure 6:
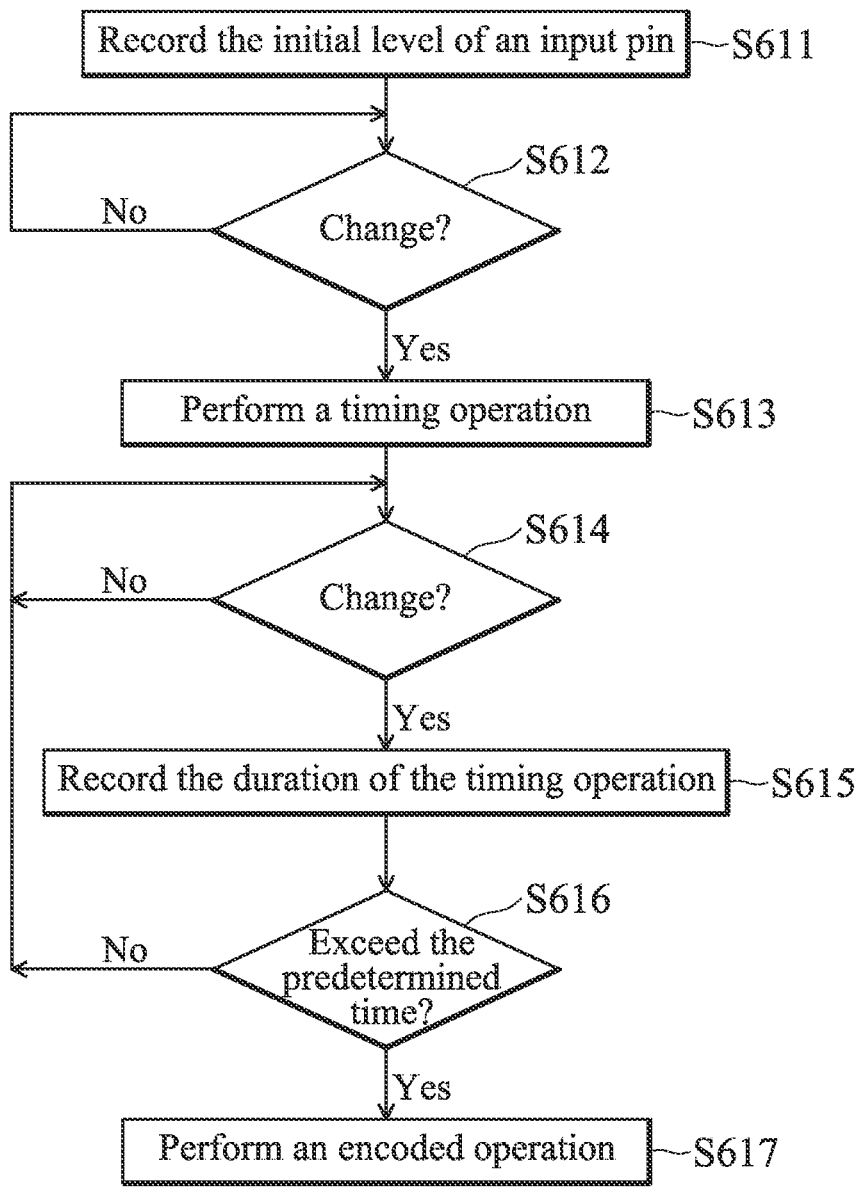
FIG. 6 is a flowchart schematic diagram of another exemplary embodiment of the operation method according to various aspects of the present disclosure.

FIG. 6 is a flowchart schematic diagram of another exemplary embodiment of the operation method according to various aspects of the present disclosure. The operation method of FIG. 6 is used to program serial input data and can be applied in the control circuit 104 shown in FIG. 1. First, the level of an input pin is recorded (step S611) and a determination is made as to whether the level of the input pin has been changed (step S612).

When the level of the input pin has been changed, a timing operation is performed (step S613). In one embodiment, step S613 is to trigger a counter so that the counter counts the number of pulses of a clock signal. In such cases, before triggering the counter, step S613 is first to reset the counter to initialize the count value of the counter.

Then, a determination is made as to whether the level of the input pin has been re-changed (step S614). When the level of the input pin is not changed, step S614 is performed to continually determine whether the level of the input pin has been re-changed. When the level of the input pin has been re-changed, the timing operation is stopped and the duration of the timing operation is recorded (step S615). Next, a determination is made as to whether the level of the input pin has maintained for predetermined time (step S616). When the level of the input pin has maintained and the duration for which the level of the input pin has maintained reaches the predetermined time, the initial level of the input pin and the duration of the timing operation are used to perform an encoded operation to generate serial input data (step S617).

When the level of the input pin remains unchanged for a duration which does not exceed the predetermined time, step S614 is performed to monitor whether the level of the input pin has been re-changed and to record the duration of the timing operation when the level of the input pin changes again. In some embodiments, as the number of times that the level of the input pin has been changed increases, the number of times that step S615 records the duration of the timing operation is increased.

Figure 7:
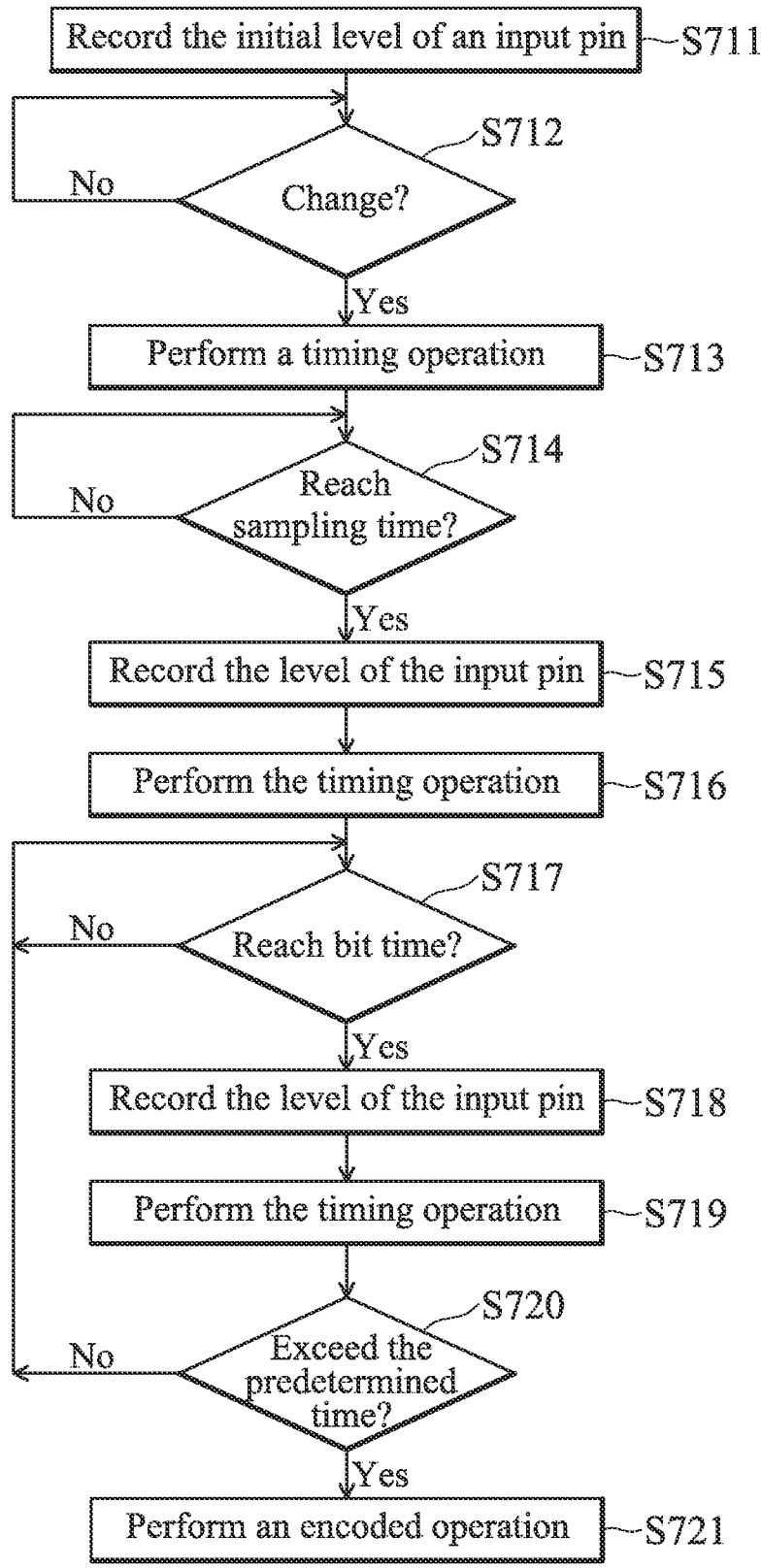
FIG. 7 is a flowchart schematic diagram of another exemplary embodiment of the operation method according to various aspects of the present disclosure.

FIG. 7 is a flowchart schematic diagram of another exemplary embodiment of the operation method according to various aspects of the present disclosure. The operation method of FIG. 7 is used to program serial input data and can be applied in the control circuit 104 shown in FIG. 1. First, an initial level of an input pin is recorded (step S711) and a determination is made as to whether the level of the input pin has been changed (step S712). When the level of the input pin has not been changed, step S712 is performed. When the level of the input pin has been changed, a timing operation is performed (step S713). Since the characteristics of step S713 is similar to the characteristics of step S613, the related description is omitted here.

A determination is made as to whether the duration of the timing operation has reached sampling time (step S714). When the duration of the timing operation has not reached the sampling time, step S714 is performed. When the duration of the timing operation reaches the sampling time, the level of the input pin is detected and recorded to generate a first sampling value (step S715). In one embodiment, if the level of the input pin is a low level, the first sampling value is the value 0. If the level of the input pin is a high level, the first sampling value is the value 1.

Then, the timing operation is re-performed (step S716). Since the characteristics of step S716 is similar to the characteristics of steps S512 and S613, the related description is omitted here. Next, a determination is made as to whether the duration of the timing operation has reached bit time (step S717). When the duration of the timing operation has not reached the bit time, step S717 is performed. When the duration of the timing operation reaches the bit time, the level of the input pin is detected to generate a second sampling value (step S718). In one embodiment, the sampling time is less than the bit time.

Next, the timing operation is re-performed (step S719). Since the characteristics of step S719 is similar to the characteristics of step S716, the related description is omitted here. Then, a determination is made as to whether the level of the input pin has remained unchanged for longer than the predetermined time (step S720). When the level of the input pin remains unchanged for a duration not exceeding the predetermined time, step S717 is performed to determine whether the duration of the timing operation reaches the bit time. Then, when the level of the input pin is unchanged for a duration that exceeds the predetermined time, the initial level of the input pin, the sampling time, and the bit time are used to execute an encoded operation to generate serial input data.

Operation methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control method for practicing the methods. The operation methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control method for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A programmable serial input-output controller coupled between an external circuit and a microcontroller, comprising:
  a timer circuit configured to perform a timing operation;
  a pin controller coupled to the external circuit and comprising:
    an input pin configured to receive an input signal from the external circuit; and
    an output pin configured to provide an output signal to the external circuit; and
  a sequence controller coupled between the pin controller and the microcontroller and operating in an output mode or an input mode,
  wherein:
  in the output mode:
    the sequence controller provides an initial level to the output pin and controls the timer circuit to perform the timing operation,
    in response to a duration of the timer circuit performing the timing operation reaching first transmission time, the sequence controller inverts a level of the output pin and controls the timer circuit to re-perform the timing operation, and
    in response to a duration of the timer circuit re-performing the timing operation reaching second transmission time, the sequence controller inverts the level of the output pin, and
  in the input mode:
    the sequence controller decodes the input signal to generate a decoded result and send the decoded result to the microcontroller.

2. The programmable serial input-output controller as claimed in claim 1, wherein the first transmission time is different from the second transmission time.

3. The programmable serial input-output controller as claimed in claim 1, wherein the first transmission time and the second transmission time are stored in the timer circuit.

4. The programmable serial input-output controller as claimed in claim 1, wherein:
  in the input mode:
    the sequence controller records an initial level of the input pin and determines whether the level of the input pin has been changed;
    in response to the level of the input pin having been changed, the sequence controller directs the timer circuit to perform the timing operation and determines whether the level of the input pin has been re-changed; and
    in response to the level of the input pin having been re-changed, the sequence controller directs the timer circuit to stop performing the timing operation and records the duration of the timer circuit performing the timing operation.

5. The programmable serial input-output controller as claimed in claim 4, wherein the sequence controller provides the initial level of the input pin and the duration of the timer circuit performing the timing operation to the microcontroller.

6. The programmable serial input-output controller as claimed in claim 4, wherein in response to the level of the input pin being maintained and the duration for which the level of the input pin being maintained reaching predetermined time, the sequence controller provides the initial level of the input pin and the duration of the timer circuit performing the timing operation to the microcontroller.

7. The programmable serial input-output controller as claimed in claim 1, wherein:
  in the input mode:
    the sequence controller records an initial level of the input pin and determines whether the level of the input pin has been changed,
    in response to the level of the input pin having been changed, the sequence controller directs the timer circuit to perform the timing operation,
    in response to the duration of the timer circuit performing the timing operation reaching sampling time, the sequence controller records the level of the input pin to generate a first sampling value and directs the timer circuit to re-perform the timing as operation, and
    in response to the duration of timer circuit performing the timing operation reaching bit time, the sequence controller records the level of the input pin to generate a second sampling value.

8. The programmable serial input-output controller as claimed in claim 7, wherein the sampling time and the bit time are stored in the timer circuit.

9. The programmable serial input-output controller as claimed in claim 7, wherein the hit time is greater than the sampling time.

10. The programmable serial input-output controller as claimed in claim 7, wherein the sequence controller provides the initial level of the input pin, the first sampling value, and the second sampling value to the microcontroller.

11. An operation system comprising:
an external circuit having a transmission terminal and a receiving terminal, wherein the transmission terminal is configured to provide an input signal, and the receiving terminal is configured to receive an output signal;
a microcontroller executing an output procedure or an input procedure; and
a programmable serial input-output controller comprising:
a timer circuit configured to perform a timing operation;
a pin controller coupled to the external circuit and comprising:
an input pin configured to receive the input signal; and
an output pin configured to output the output signal; and
a sequence controller coupled between the pin controller and the microcontroller,
wherein:
in response to the microcontroller executing the output procedure, the sequence controller provides an initial level to the output pin and controls the timer circuit to perform the timing operation,
in response to a duration of the timer circuit performing the timing operation reaching first transmission time, the sequence controller inverts the level of the output pin and controls the timer circuit to re-perform the timing operation,
in response to the duration of the timer circuit re-performing the timing operation reaching second transmission time, the sequence controller inverts the level of the output pin, and
in response to the microcontroller executing the input procedure, the sequence controller decodes the input signal to generate a decoded result and send the decoded result to the microcontroller.

12. The operation system as claimed in claim 11, wherein in response to the microcontroller executing the input procedure:
the sequence controller records an initial level of the input pin and determines whether the level of the input pin has been changed;
in response to the level of the input pin having been changed, the sequence controller directs the timer circuit to perform the timing operation and determines whether the level of the input pin has been re-changed; and
in response to the level of the input pin having been re-changed, the sequence controller directs the timer circuit to stop performing the timing operation and records the duration of the timer circuit performing the timing operation.

13. The operation system as claimed in claim 12, wherein in response to the level of the input pin being maintained and the duration for which the level of the input pin being maintained reaching predetermined time, the sequence controller generates an interrupt signal to the microcontroller.

14. The operation system as claimed in claim 13, wherein after receiving the interrupt signal, the microcontroller generates serial input data according to the initial level of the input pin and the duration of the timer circuit performing the timing operation and operates according to the serial input data.

15. The operation system as claimed in claim 11, wherein in response to the microcontroller executing the input procedure:
the sequence controller records an initial level of the input pin and determines whether the level of the input pin has been changed,
in response to the level of the input pin having been changed, the sequence controller directs the timer circuit to perform the timing operation,
in response to the duration of the timer circuit performing the timing operation reaching sampling time, the sequence controller records the level of the input pin to generate a first sampling value and directs the timer circuit to re-perform the timing operation, and
in response to the duration of the timer circuit performing the timing operation reaching bit time, the sequence controller records the level of the input pin to generate a second sampling value.

16. The operation system as claimed in claim 15, wherein the sequence controller provides the initial level of the input pin, the first sampling value, and the second sampling value to the microcontroller, and the microcontroller generates serial input data according to the initial level of the input pin, the first sampling value, and the second sampling value, and operates according to the serial input data.

17. An operation method for programming serial input data and serial output data, comprising:
setting a level of an output pin to an initial level;
performing a timing operation;
determining whether a duration of the timing operation reaches first transmission time,
inverting the level of the output pin and re-performing the timing operation in response to the duration of the timing operation reaching the first transmission time;
determining whether the duration of the timing operation reaches second transmission time after re-performing the timing operation; and
inverting the level of the output pin in response to the duration of re-performing the timing operation reaching the second transmission time,
wherein the level of the output pin constitutes the serial output data.

18. The operation method as claimed in claim 17, further comprising:
recording an initial level of an input pin;
determining whether the level of the input pin has been changed;
performing the timing operation and determining whether the level of the input pin has been re-changed in response to determining that the level of the input pin has been changed;
stopping the timing operation and recording the duration of the timing operation in response to determine that the level of the input pin has been re-changed; and
using to the initial level of the input pin and the duration of the timing operation to perform an encoder operation to generate serial input data.

19. The operation method as claimed in claim 18, further comprising:
determining whether the level of the input pin is maintained, and whether the level of the input pin is maintained for a duration that exceeds predetermined time; and starting the encoder operation in response to determine that the level of the input pin is maintained and the level of the input pin is maintained for a duration that exceeds predetermined time.

20. The operation method as claimed in claim 17, further comprising:
recording an initial level of an input pin;
determining whether the level of the input pin has been changed;
performing the timing operation in response to the level of the input pin having been changed;
in response to the duration of the timing operation reaching sampling time, recording the level of the input pin to generate a first sampling value and re-performing the timing operation;
recording the level of the input pin to generate a second sampling value in response to the duration of the timing operation reaching bit time; and
using the initial level of the input pin, the sampling time, and the bit time to perform an encoder operation to generate serial input data.

\* \* \* \* \*